United States Patent [19]

Heckethorn

[11] 4,147,384

[45] Apr. 3, 1979

[54] U-BOLT CLAMP

[75] Inventor: John E. Heckethorn, Dyersburg, Tenn.

[73] Assignee: Heckethorn Manufacturing Co., Dyersburg, Tenn.

[21] Appl. No.: 868,798

[22] Filed: Jan. 12, 1978

[51] Int. Cl.$^2$ ............................................. F16L 13/14
[52] U.S. Cl. ................................. 285/382.2; 24/277; 285/420
[58] Field of Search .................. 24/277, 278; 285/420, 285/382.2, 197, 198, 199, 373, 419, 180

[56] References Cited

U.S. PATENT DOCUMENTS

| | | | |
|---|---|---|---|
| 1,727,896 | 9/1929 | Mraz | 285/382.2 X |
| 1,831,641 | 11/1931 | Skinner | 285/197 |
| 2,719,345 | 10/1955 | Riker | 285/420 |
| 3,955,250 | 5/1976 | Heckethorn | 24/278 |

Primary Examiner—Dave W. Arola
Attorney, Agent, or Firm—Dennison, Dennison, Meserole & Pollack

[57] ABSTRACT

A clamp for securing together in locked relationship a pair of telescoped pipes or tubes. The clamp consists of a novel U-bolt having a swaged flat rim on the inner portion of its bight which reduces the radius of the bight portion, and a novel saddle member having a semicircular cut-out and being further chamfered adjacent the ends of the semicircular cut-out to define a greater diameter. The assembly when in its loading position will accept a pipe joint of greater outside diameter than the inner diameter of the tightened clamp; and wherein tightening of the clamp initially deforms the pipe joint into an ovaled configuration and subsequently returns it to a circular configuration and impresses a bead thereabout for 360°.

9 Claims, 9 Drawing Figures

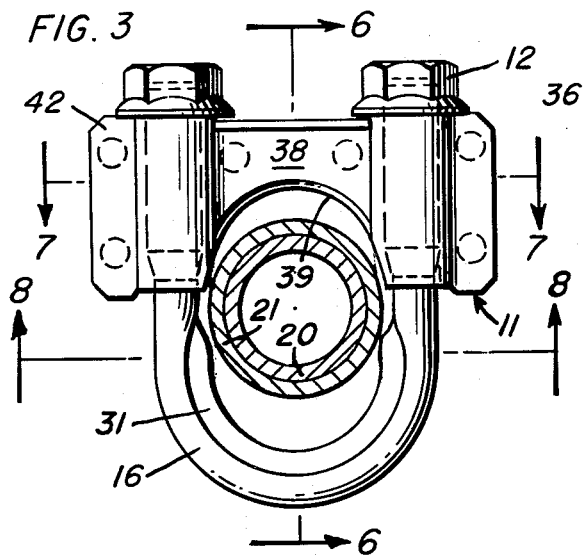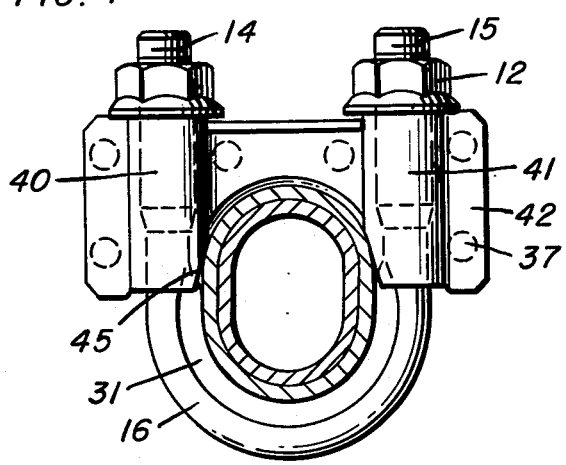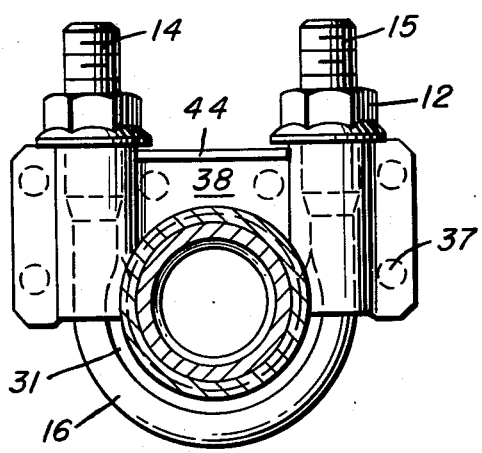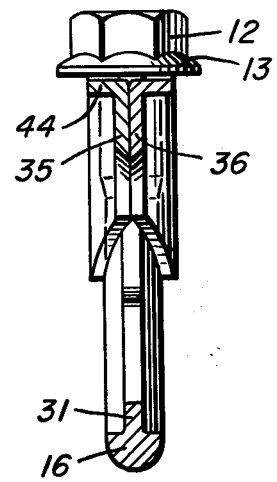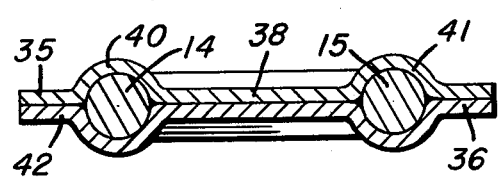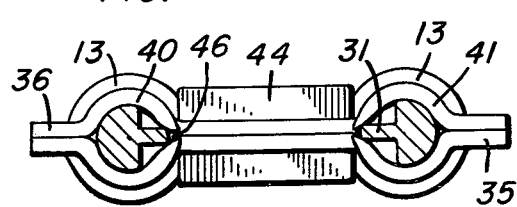

U-BOLT CLAMP

BACKGROUND

The field of the present invention is the art of U-bolt saddle clamps that are employed for holding sections of tubing in telescoped connection or securing together cable sections which are generally referred to as U-bolt clamps or saddle clamps. Such devices are frequently employed in the exhaust systems of automotive vehicles powered by internal combustion engines.

The prior art directly concerned with such clamps is, for the most part, derived from a basic assembly comprising a U-bolt having a semicircular bight portion integrally connecting a pair of generally parallel legs which are threaded on their ends and which are received in axially slidable relation within a sheet steel saddle member having tubular portions receiving and housing the bolt legs and connected by a central web extending transversely between the tubular housings and integral therewith. The free threaded ends of the legs receive nuts that are tightened up against the tubular portions of the saddle member to clamp together a joint of telescoped tubes, such as for example, an exhaust joint disposed between the bight of the U-bolt and the curved edge of the saddle member.

In recent years exhaust system gas-tightness and mechanical security requirements have been amplified by governmental pollutant standards, stimulating the development of stronger and more effective clamp designs.

One widely used U-bolt clamp proven capable of dealing with present industry requirements in millions of automotive and truck installations, is noted in Heckethorn U.S. Pat. No. 3,955,250. An equally effective, lighter duty clamp is exemplified by pending Heckethorn application Ser. No. 796,217, filed May 12, 1977. The above clamps are currently produced in sizes 1.5 inches through 6.0 inches.

A new requirement has recently developed in the automotive industry for joining and sealing very small stainless steel tubing, used for exhaust gas recirculation and exhaust gas air injection systems.

Prior art U-bolt clamps made in accordance with Heckethorn U.S. Pat. 3,955,250 are, of necessity, larger in diameter than the tubing to which they are applied. When tightened sufficiently to form a gas-tight locking bead, the tubing is somewhat out of round. On tubing joints within the normal 1.5 inch to 6.0 inch range this out of roundness is of little concern. On very small tubing joints of, for instance $\frac{3}{8}$ inch diameter, the out of roundness is both noticeable and harmful from a gas flow and leakage standpoint.

The U-bolt clamp of the present invention has an internal diameter substantially smaller than the outside diameter of the tubing joint to which it is applied. An extremely uniform bead is formed 360° about the joint, assuring perfect roundness, gas tightness and mechanical security. The saddle portion of the clamp is reinforced preferably to prevent web twist to give greater strength and stability, as in my copending application noted above.

The invention consists in the novel design of both the saddle member and the U-bolt portion to permit for the first time in the art the coupling together of pipe members having an outside diameter that is actually larger than the internal diameter of the assembled and closed U-bolt clamp.

OBJECTS OF THE INVENTION

The present invention has for a principal object the provision of an improved U-bolt clamp means usable with telescoped tubes or pipe sections which may be drawn into sealing engagement with a pipe having an outer diameter greater than the internal diameter of the finally assembled clamp.

Another object of the invention is to provide a U-bolt clamp arrangement which will provide leak-tight sealing engagement by means of accurate bead indentation throughout the circumference of the tubing.

It is another object of the invention to provide a U-bolt and saddle construction for joining together in telescoping relation, relatively thick walled tubing by providing extremely narrow tube contact areas on the specially designed U-bolt and saddle member and which clamp can be installed with conventional hand tools if desired.

Yet another object of the invention is the provision of a U-bolt saddle clamp means which may be economically manufactured in large quantities from sheet metal and rod stock, which is simple and safe in use and which can be used to secure the exhaust recirculating tubes and converter air injector tubes in modern vehicles.

Further objects and advantages are within the scope of the present invention and numerous other features will be apparent from a consideration of the specification and drawings.

DESCRIPTION OF THE DRAWINGS

FIG. 3 is a front elevation of the clamp assembly in the fixe-receiving or loading position;

FIG. 4 is a front elevation of the clamp in the confining position during initial tightening of the nuts;

FIG. 5 is a front elevation of my clamp in the tightened final position of assembly;

FIG. 6 is a sectional view taken along the line 6—6 of FIG. 3 with the pipe removed;

FIG. 7 is a cross section taken along the line 7—7 of FIG. 3 with the pipe removed;

FIG. 8 is a cross section through the U-bolt along the line 8—8 of FIG. 3 with the pipe removed.

DETAILED DESCRIPTION

Figure 1:
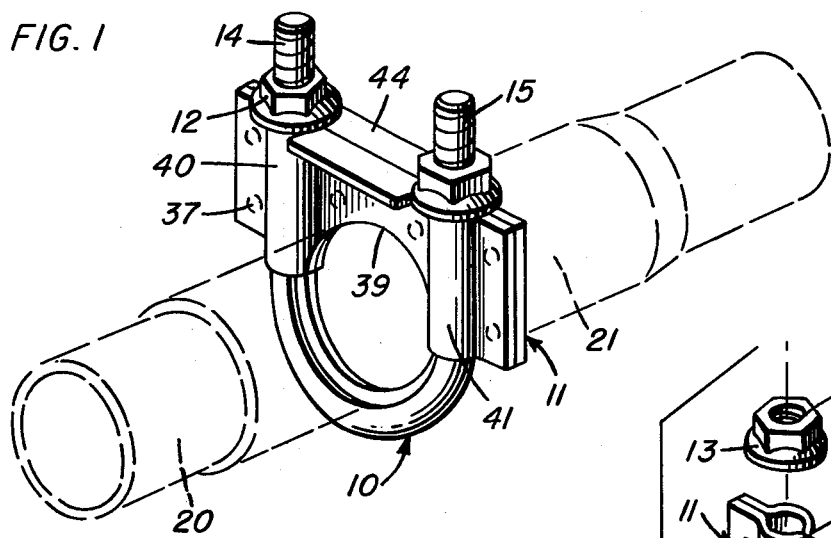
FIG. 1 is a perspective view of my new U-bolt clamp shown in assembled condition with a typical exhaust pipe connection shown in dotted lines.
Figure 2:
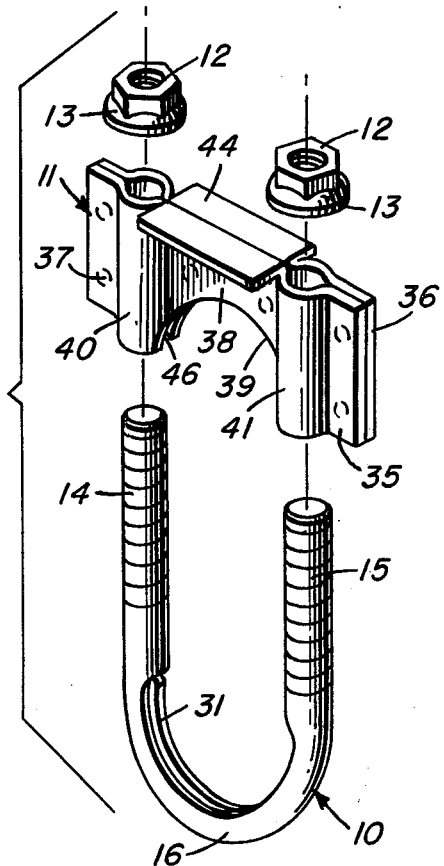
FIG. 2 is an exploded perspective of the components of the new clamp.

The invention herein disclosed in an assembly of four separate parts: a special U-bolt 10, a saddle member 11, and two securing nuts 12 having preferably integral washer portions 13. The nuts 12 are threaded on the free ends of the legs 14 and 15 which extend in generally parallel relation from the semicircular bight 16 of the U-bolt 10.

It will be noted that the saddle member 11 is slidable axially on the legs 14 and 15 between the securing nuts and the bight 16 of the bolt. In operation, a coupling of telescoped tubular members such as shown at 20 and 21 in FIG. 1 is compressed between the saddle and the bight portions of the U-bolt when the saddle is moved toward the bight portions of the U-bolt when the saddle is moved toward the bight under the force of the nuts 12 as they are drawn up on the legs 14 and 15.

The bight portion 16 of U-bolt 10 is especially formed as can best be seen in FIGS. 1 through 6. By means of a swaging operation or the like a flattened portion extending for more than 180° in the bight is formed at 31. In the illustrative embodiment of the invention, the clamp is specifically designed to have a closed diameter of 0.875 inches (22.2 mm). With this arrangement a tubing joint larger than 0.962 inches (24.4 mm) will freely enter the clamp in its open or loading position. The U-bolt for this application can be formed of C-1039 steel rod and will have an inner leg spacing measured in the nonswaged area immediately adjacent the screw threads of 1.009 inches (25.6 mm). The diameter across the swaged area would match the designed diameter of the closed clamp namely 0.875 inches (22.2 mm). In this model the thickness of the swaged area would be 0.060 inches (1.52 mm). The rod stock from which the U-bolt is formed is in this instance 0.216 inches (5.49 mm).

The saddle member 11 is preferably constructed in the embodiment shown and disclosed from initially planar thin oblong sheet steel blanks of 16 gauge 950X steel strip. The saddle member is constituted of two such blanks 35 and 36 which are projection welded together as at 37 as an integral body unit, although as an alternative embodiment the saddle member can be formed of a single blank doubled upon itself somewhat in the manner taught in my prior U.S. Pat. No. 3,955,250.

The saddle member 11 includes a central web portion 38 having a cut-out area greater than a semicircle as shown at 39. At either end of the portion 38 are tubular U-bolt receiving portions 40 and 41. A flat tab portion 42 extends on one side of the tubular portion. Reinforcing flange means 44 may be provided extending normally to each of the blanks 35 and 36. These flanges serve to greatly reinforce the web portions against distortion and roll-over when under the force generated by high level torque incident to tightening of a clamp in which the saddle is employed in service. The flange is not essential to all forms of the invention, but is shown in the preferred embodiment.

As will best be seen in FIG. 4, the cut-out portion 39 is provided with an angled, tapered or chamfered cut away portion 45 extending at an angle of approximately 15° from the vertical. The exact angle is not critical and a fairly broad range of angles is contemplated. It is also comtemplated that a curve as well as a straight chamfer may be used. This permits clearance necessary for reception of the coupled pipe joint, and provides a cam action upon the tubing joint when pretightening. As will be noted in FIG. 2, the blank portions 35 and 36 have a tapered slot shown at 46 adjacent the 15° angled portion. This slot permits entry therein of the swaged portion 31 of the U-bolt so that during a tightening sequence the swaged portion will enter into the slot and upon application of tightening force on the nut members will wedge therein. This cut away slot is also shown in FIG. 8.

The inner face of the cut-out 39 is beveled or tapered as at 47 (FIG. 9) in order to form a narrow groove or bead when the saddle is secured on a pipe joint. Such groove or bead is shown in FIG. 9 at B and by virtue of the swaged portion 31 and the beveled portion 47 extends completely about the joint for 360°.

The manner of operation of the device and insertion over a telescopic joint connection is shown in FIGS. 3-6. In FIG. 3, the nuts 12 are preassembled on the far ends of the threaded portions 14 and 15, and the saddle member 11 has been raised upwardly to its maximum extent. In this position the assembled pipe connection 20 and 21 can be freely received within the widest portion of the assembled clamp. Application of torque to the nuts 12 will cause the swaged portion 31 of the U-bolt 16 to be drawn into the opening 46 and the pipe will be drawn into an ovaled configuration as shown in FIG. 4. This position is known as the confining position.

Figure 9:
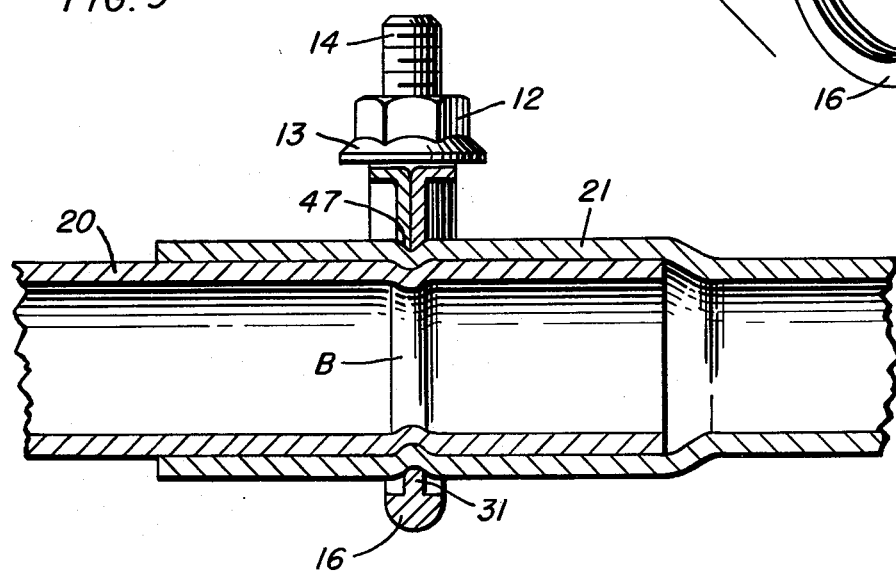
FIG. 9 is a vertical cross section showing the clamp assembled on a pair of joined tubular pipe members.

Continued application of torque to the nuts 12 will result in the final configuration of FIG. 5 wherein it will be seen the pipe connection has returned to its circular shape and is now provided with an indentation or groove B which is shown in FIG. 9 and in dotted lines in FIG. 5. This extremely uniform bead B formed by the clamp provides high resistance to both longitudinal and rotational forces and ensures gas tightness. Even with deep weld seams, the leakage is usually 0.5 cubic feet/hour at 15 psi. The depth of the bead B is controlled by proper selection of the inside radius.

It will thus be seen that my new clamp, which is designed to fit a tubing joint actually larger than itself and to withstand rather significant torque, fully meet the automotive industry requirements for the new gas circulation tubing requirements. The new construction overcomes numerous problems in the prior art and yet is less costly to produce and uses less materials than the earlier fastening devices heretofore available.

I claim:

1. In a clamp for sealing and interlocking telescoped metal tubes or the like to each other, said clamp comprising a U-bolt having a pair of parallel, spaced legs, said legs having threaded ends, and a semicircular bight portion located between and interconnecting said legs, a saddle member having a pair of spaced tubular parallel housings adapted to receive said U-bolt legs, and nut means adapted to thread onto the ends of said legs to move said saddle member toward said bight portion, the improvement comprising said bight portion of the U-bolt being provided on its inner face between said legs with contact means extending for more than 180° and extending inwardly towards the bight center and adapted to contact the outer of said telescoped metal tubes, said saddle being formed of a pair of substantially identical planar sheet metal webs welded together in face-to-face contact and having an arcuate cut-out portion of less than 180° extending between said housings, the ends of the cut-out portion being chamfered outwardly to provide a large mouth opening, wherein a pair of metal tubes having an outside diameter that is greater than the inside diameter of the clamp when completely tightened about the telescoped tubes may be received by virtue of the opening between the U-bolt legs and the chamfered ends of the cut-out portion, said cut-out portion having means thereon cooperating with said contact means when the clamp is in its completely tightened condition to provide a continuous uniform circumferential bead on said telescoped tubes.

2. A clamp as defined in claim 1, wherein said means on said cut-out portion comprises beveled edge to provide a relatively sharp face which cooperates with said contact means of said U-bolt to impress a narrow 360° bead on said metal tubes during tightening of said nuts.

3. A clamp as defined in claim 1, and further including a reinforcing flange extending at right angles from each face of said saddle at the edge opposite said cut-out.

4. A clamp as defined in claim 2, and further including a reinforcing flange extending at right angles from each face of said saddle at the edge opposite said cut-out.

5. A clamp as defined in claim 1, wherein the sheet metal webs are separated at said chamfered region to provide a tapered slot for the reception of the end portions of said contact means on said U-bolt which will wedge therein during tightening of said nuts.

6. A clamp as defined in claim 1, wherein said contact means is swaged from the round bolt body.

7. A clamp as defined in claim 1 wherein said contact means is provided with a cam surface at the ends thereof adjacent said U-bolt legs to cam against said metal tubes during the initial tightening of said nut means.

8. A clamp surface as defined in claim 1 wherein the cut-out portion and the chamfer is greater than 180°.

9. A clamp as defined in claim 1 wherein the chamfer is at an angle of about 155° to the vertical.

* * * * *